United States Patent [19]

Williams

[11] 4,173,327
[45] Nov. 6, 1979

[54] SOLID HANDLING VALVE

[75] Inventor: William R. Williams, Morgantown, W. Va.

[73] Assignee: The United States of America as represented by the United States Department of Energy, Washington, D.C.

[21] Appl. No.: 802,328

[22] Filed: Jun. 1, 1977

[51] Int. Cl.² ............................................. F16K 31/12
[52] U.S. Cl. ....................................... 251/31; 251/63; 251/332
[58] Field of Search .................. 92/118, 182; 137/219; 251/175, 31, 63, 63.5, 15, 332

[56] References Cited

U.S. PATENT DOCUMENTS

| 1,508,264 | 9/1924 | Armentrout | 92/182 |
| 2,075,812 | 4/1937 | Kerr et al. | 251/31 |
| 2,095,410 | 10/1937 | Diesher | 251/31 |
| 2,953,345 | 9/1960 | Slemmons et al. | 251/175 |

Primary Examiner—Martin P. Schwadron
Assistant Examiner—A. Michael Chambers
Attorney, Agent, or Firm—Dean E. Carlson; Stephen D. Hamel; Earl L. Larcher

[57] ABSTRACT

The present invention is directed to a solids handling valve for use in combination with lock hoppers utilized for conveying pulverized coal to a coal gasifier. The valve comprises a fluid-actuated flow control piston disposed within a housing and provided with a tapered primary seal having a recessed seat on the housing and a radially expandable fluid-actuated secondary seal. The valve seals are highly resistive to corrosion, erosion and abrasion by the solids, liquids, and gases associated with the gasification process so as to minimize valve failure.

5 Claims, 4 Drawing Figures

SOLID HANDLING VALVE

The present invention relates generally to a valve for use in controlling flow of particulate coal into a coal gasifier used in the conversion of coal to high or low Btu gas by gasification and, more particularly, to a solids handling valve for use with a lock hopper utilized for conveying pulverized coal from a coal bunker to the coal gasifier.

Because of the world-wide increased use of energy resources, there is an ever growing demand for new sources of energy. The relatively small reserves of petroleum and natural gas have caused many people in the energy area to consider different methods for converting the vast coal resources of the world to useable fuels. In this area, coal gasification is attracting attention as a technique of converting coal to high and low Btu gas which may be readily used for applications such as electrical power generation. Of the various known coal gasification processes wherein pulverized coal is introduced into a coal gasifier, one technique for feeding the coal into the gasifier is by using a lock hopper arrangement which generally comprises one or more valved hoppers disposed between a coal bunker and the gasifier. Coal from the bunker is loaded into the hopper at atmospheric pressure through a valve-controlled passageway and then the hopper is closed and a pressurizing fluid introduced into the hopper to pressurize the hopper to a pressure corresponding to that of the gasifier. A further valve-controlled passageway is then opened to discharge the pressurized charge of coal into the gasifier. After discharging the coal, the hopper must then be depressurized before a further charge of coal from the bunker can be placed therein.

Lock hopper valves must operate over many cycles without leakage in the dusty and highly abrasive environment encountered in coal gasification operations and are required to handle differential pressures of more than 100 psig and temperature up to 2000° F. Often, several stages of lock hoppers are necessary in order to pressurize the coal from atmospheric pressure at the bunker to the operating pressure of the gasifier. The timing of the valves in the lock hopper for opening, closing, purging, and pressurizing requirements necessitate the use of a sophisticated system wherein the slight failure of a single valve may result in the failure of the entire lock hopper system.

Another requirement of the valves used in lock hopper operations is the necessity for accurately controlling the rate of solids discharged into the reaction vessel. Previously, on-off valves used in lock hopper service suffered from excessive exposure of the critical valve components to the abrasive, erosive, and corrosive conditions present during the gasification operation.

Accordingly, it is the primary aim or goal of this invention to provide an improved valve for use with lock hoppers utilized for feeding pulverized coal into the coal gasifier. This goal is achieved by employing a fluid-actuated valve in which the seat of the primary valve closure or seal is at a recessed location in the valve which is substantially protected from the flow of the abrasive pulverized coal. A secondary seal of the valve is fluid-actuated and carried by a fluid-movable member or piston of the valve. This secondary seal is radially expandable to engage the surface of the valve housing for preventing the flow of the abrasive gases and solids from the coal gasifier from contacting the primary seal. By providing the primary seal with the recessed seat and by using a fluid-expandable secondary seal which is removed from the flow path of the solids and gases when the valve is open, the valve seals are highly resistant to erosion and corrosion by the solids, liquids and gases associated with the gasification operation so as to greatly increase the life of the valve in a coal gasification operation.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purpose of illustration and description. The preferred embodiment illustrated is not intended to be exhaustive or to limit the invention to the precise form disclosed. It is chosen and described in order to best explain the principles of the invention and their application in practical use to thereby enable others skilled in the art to best utilize the invention in various embodiments and modifications as are best adapted to the particular use contemplated.

Figure 1:
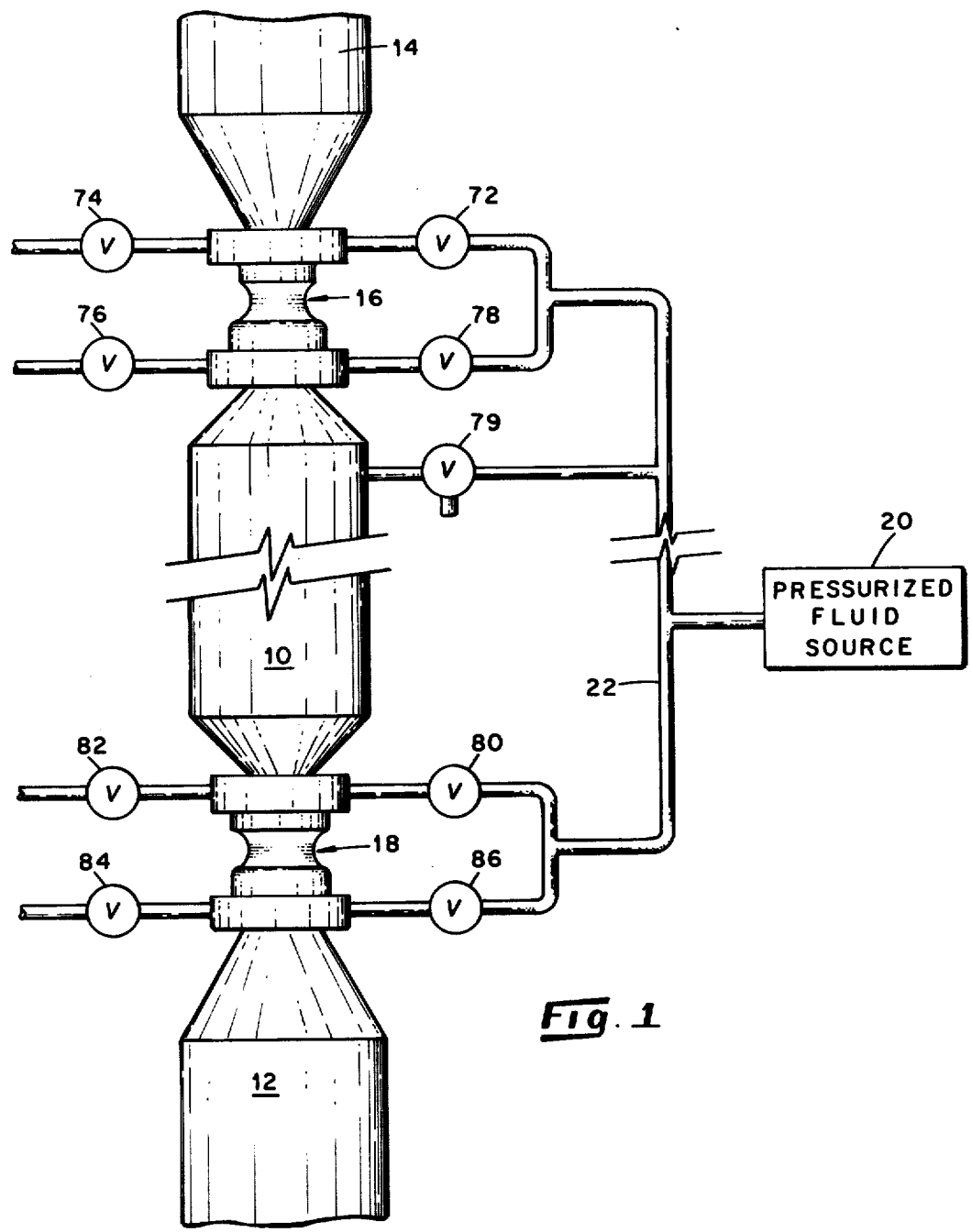
FIG. 1 is a highly schematic illustration showing a lock hopper with valves of the present invention as they may be employed between a coal bunker and a coal gasifier for regulating the flow of pulverized coal into the gasifier.
Figure 2:
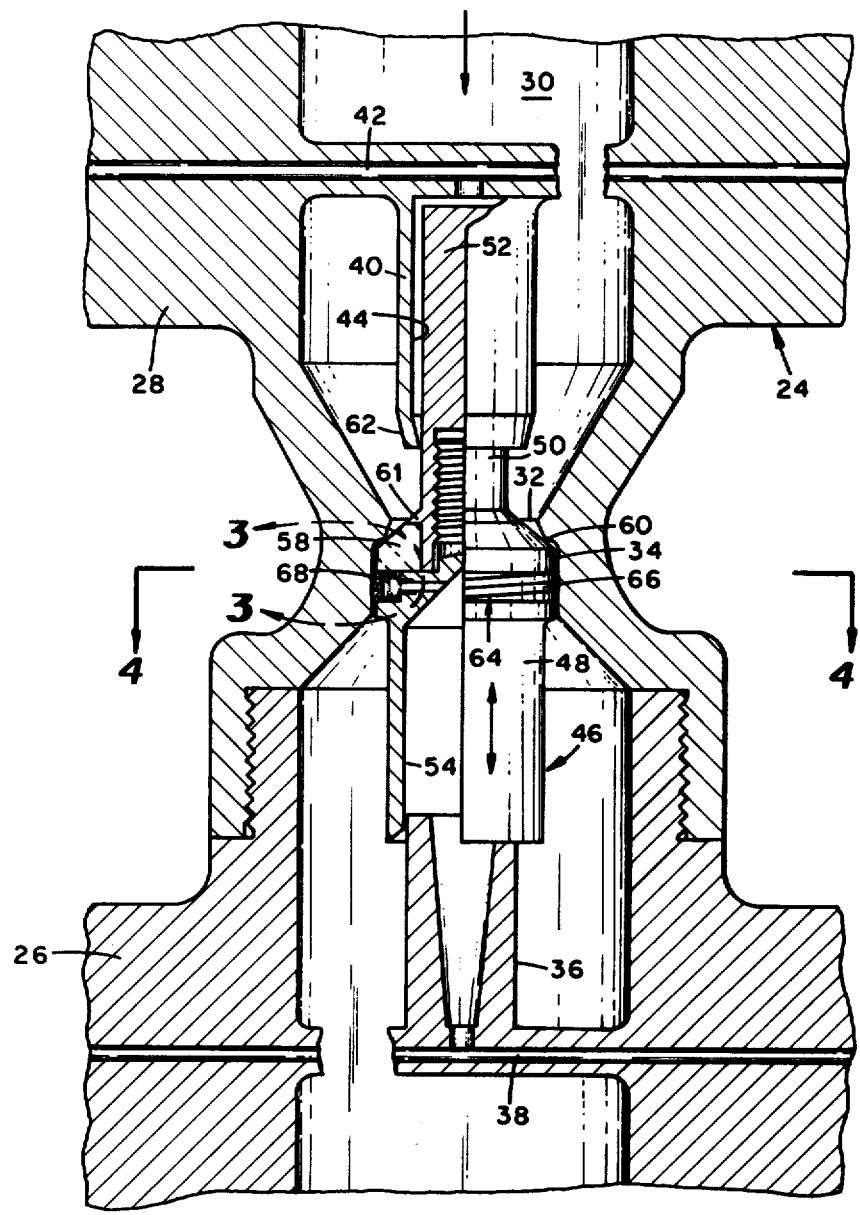
FIG. 2 is a detailed elevational sectional view showing the fluid actuated valve of the present invention.

Described generally and with reference to FIG. 1, the present invention relates to a lock hopper system, such as generally shown at 10, for introducing pulverized coal into a coal gasifier, generally shown at 12, and which usually operates at a pressure in the range of about 100 to 1500 psig and a temperature in the range of about 1700° to 2500° F. The pulverized coal is loaded into the lock hopper 10 from a bunker 14 through a valving arrangement which includes a valve 16 disposed between the coal bunker 14 and the hopper 10 and a valve 18 disposed between the coal hopper and the gasifier 12. These valves may be similarly constructed in accordance with the present invention and are fluid actuatable by using a suitable pressurized fluid, such as air or the like, provided from a pressurized fluid source 20 via a valved conduit system 22. Typically, in operating the coal hopper 10 is loaded with a charge of coal by closing the lower valve 18 and opening the upper valve 16 so as to gravity feed the pulverized coal into the hopper. When the hopper 10 is sufficiently charged with coal, valve 16 is closed and the hopper 10 is pressurized to a pressure at least equal to that employed in the gasifier 12. Upon completion of the pressurization step, the valve 18 is opened to allow the pulverized coal to fall into the gasifier. The operation of the valve 18 is preferably regulated so as to feed the coal into the gasifier 12 at a preselected rate. When the coal hopper 10 is empty, valve 18 is closed and the pressure within the coal hopper reduced to that corresponding o the coal bunker 14 prior to the opening of valve 16 for receiving a further charge of the pulverized coal.

In many coal gasification operations, there may be a series of coal hoppers, such as shown at 10, with valve arrangements similar to that shown at 16 and 18 between each of the coal hoppers so as to provide for staging the pressurization of the coal hoppers.

Described more specifically, the present invention is directed to the valves shown at 16 and 18 of FIG. 1, each of which comprises a valve body or housing 24 formed of lower and upper sections 26 and 28 joined together by a threaded arrangement, as shown, or any other convenient coupling mechanism so as to provide for the ready disassembly and repair of the valve. The joined upper and lower sections 26 and 28 of the valve body provide for a centrally disposed throughgoing passageway 30 having converging-diverging segments therein defining a throat 32 adjacent which the primary and secondary seats of the valve are located. The primary valve seat is in the diverging segment of the throat at a location near the throat 32 while the secondary seat 34 is located near the primary seal in the diverging segment of the throat which is below or downstream from the primary seat with respect to direction of coal movement so as to be exposed to the high pressure and temperature of the coal gasifier when the valve, i.e., valve 18 is in a closed position. The lower section 26 of the valve body 24 is provided with an annular, centrally disposed open-ended boss 36 projecting longitudinally within the passageway 30 towards the throat 32 with the interior of the boss 36 being in registry with a fluid passageway 38 in the valve body coupled to valved conduit system 22 (FIG. 1). The upper section 28 of the valve body 24 is also provided with an annular, centrally disposed open-ended boss 40 projecting longitudinally within the passageway 30 in a direction towards the oppositely projecting boss 36. This boss 40 is provided with a central receptacle 44 in communication with the fluid passageway 42 in the valve body which, in turn, is coupled to the valved conduit system 22.

Disposed within the fluid passageway 30 intermediate the bosses 36 and 40 is a movable valve closure member or piston 46 which is reciprocably displaced by pressurized fluid along the longitudinal axis of the valve so as to regulate the flow of coal between the coal bunker 14 and the lock hopper 10 or between the lock hopper 10 and the coal gasifier 12. This piston 46 comprises a lower section 48 and an upper section 50 which are joined together in any suitable manner, such as the threaded engagement shown. The upper section 50 of piston 46 consists of a solid cylindrical end portion 52 which is of a diameter less than the inner diameter of the receptacle 44 of boss 40 so as to be readily received therein. The lower section 48 of the piston 46 comprises an annular receptacle 54 of a diameter greater than the outer diameter of the boss 36 for reception of the latter within the piston receptacle 54.

With the described arrrangement of the piston end portions 52 and 54 with respect to the bosses 40 and 36 respectively, the introduction of pressurized fluid through either passageway 38 or 42 will effect movement of the piston 46 in either longitudinal direction along the longitudinal axis of the valve body to selectively position the piston 46 for closing or controllably opening the valve, as will be described in greater detail below. To effect these operations of the valve the upper section 52 of piston 46 is provided with a frustum or outwardly tapered, conical shoulder 58 which has a maximum diameter greater than that of the throat 32 and which provides the primary seal within the valve housing 24 by its contact with seat 60 near the throat 32. The conical shoulder 58 may be formed of an elastomeric material or any suitable ceramic or alloy material, which is capable of providing a satisfactory seal when the shoulder 58 is held against seat 60. The shoulder 58 is removable from the piston 46 for replacement purposes, if necessary. The shoulder 58 is held in place by joining the piston sections 52 and 54 with the upper end of the shoulder abutting against a lip 61 on the piston section 52. The seat 60 is of a diameter greater than that of said throat and is recessed with respect to the throat 32. The seat 60 is in the configuration of a circular lip or shoulder and is oriented in the diverging segment of the throat 32. With the seat 60 so located the solids flowing through the passageway 30 will have minimal contact with the seat 60. When the piston 46 is displaced by the fluid from passageway 42 acting upon the end of the piston section 52 to move the shoulder 58 away from the seat 60, excess fluid escapes from within the receptacle and passes downwardly and outwardly over the surface of the conical shoulder to sweep the pulverized coal and other solids therefrom. This sweeping action assures that when the conical shoulder subsequently engages the seat 60 that a satisfactory seal is established therebetween. To facilitate the sweeping action, the innermost end portion of the boss 40 is tapered inwardly, as shown at 62, to provide a laminar sheet of fluid against the surface of the upper section of piston 52.

Figure 3:
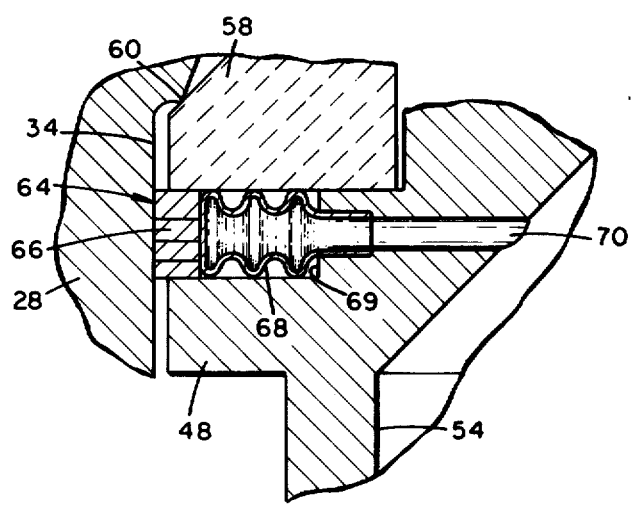
FIG. 3 is a fragmentary view taken along line 3—3 of FIG. 2 showing details of the primary and secondary sealing arrangement.
Figure 4:
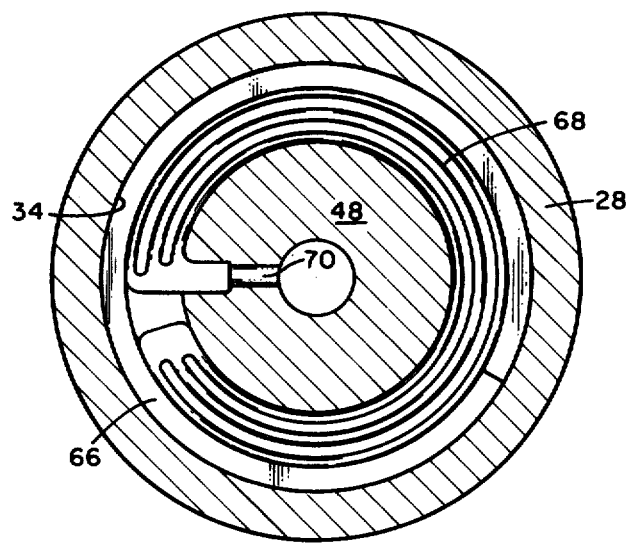
FIG. 4 is a sectional plan view taken along line 4—4 of FIG. 2 showing details of the secondary fluid expandable seal.

The secondary seal 64, as best shown in FIGS. 3 and 4, is a fluid-actuatable, radially expandable seal which comprises a metal helically-wound expansion coil or rings 66 which can be uniformly, radially expanded to a greater diameter by the application of an internal force, but yet which will retract to its regular configuration when the application of the internal force is removed. To provide this internal force against the expansion rings 66 for effecting the secondary seal between the outermost surfaces of the expansion rings 66 and the recessed surface 34 of the valve body 28 is an annular fluid-operated bellows 68 formed of an expandable material, such as Monel metal or ductile Ni-Cr steel, which is resistant to the heat and other conditions encountered within the gasification operation. The rings 66 and the bellows 68 are disposed within an annular recessed cavity 69 in the lower piston section 54. The bellows expanding fluid for radially displacing the rings 66 is provided through a passageway 70 which is in registry with the interior of the bellows 68 and the interior of the lower end section 54 of the piston. Fluid introduced through the passageway 38 from the source 20 via the valved conduit system 22 enters the receptacle 54 in the lower piston section 48 and vertically displaces the piston 46 along the longitudinal axis of the valve body 24 until shoulder 58 contacts the seat 60 to effect the primary seat. As this fluid from line 38 displaces the piston, it also enters the bellows 68 through passageway 70 and radially expands the rings 66 against the valve body surface 34 for providing the secondary seal. The bellows 68 are expanded during the valve closure and as the fluid pressure in the receptacle 54 of the piston increases the rings 66 are circumferentially expanded and until they provide an even distribution of force against the valve body surface 34 to provide the secondary seal.

When it is desired to open the valve for allowing the pulverized coal to move at a controlled flow rate, the flow of the pressurized fluid through the passageway 38 is terminated and vented with the resulting decrease in fluid pressure in the bellows 68 allowing for the retraction of the rings 66 forming the secondary seal to their original position so as to be out of contact with the valve body surface 34 during the movement of the piston. The valve opening is then effected by introducing pressurized fluid from the source 20 via the valved conduit system 22 through line or passageway 42 which acts against the top end of the piston section 52 for displacing the piston 46 along the longitudinal axis of the valve body 24 in a direction and moves tapered shoulder 58 away from the seat 60. As mentioned above, the fluid utilized for displacing the piston to open the valve also flows over the tapered shoulder 58 to sweep it clean of any solids clinging thereto so that a subsequent closure of the valve will not be hindered due to the presence of solids on this tapered surface.

In a typical operation of the valve of the present invention in a lock hopper system used for coal gasification, as generally shown in FIG. 1, the valved conduit system 22 coupling the fluid source 20 to the valves is provided with control valves 72 and 78 leading to valve 16 and valves 80 and 86 leading to valve 18. Valves 16 and 18 are respectively provided with vent valves 74 and 76 and 82 and 84. In filling the coal hopper 10 with a charge of pulverized coal from a supply contained in coal bunker 14, the valve 18 is closed so as to isolate the coal hopper 10 from the gasifier 12. The valve 16 is then opened by opening the valve 72 and closing valve 74 so that the high-pressure fluid from source 20 will enter passageway 42 of the valve 16 and move the piston 46 along the vertical axis of the valve to open the passageway 30 at the valve throat 32. To assure that the movement of the piston 46 is unimpeded, the vent valve 76 is opened and the valve 78 is closed. When the coal hopper is adequately charged with coal, the valve operation is reversed in that valve 74 is opened, valves 72 and 76 are closed, and valve 78 is opened so that the high-pressure fluid from source 20 will enter passageway 38 of the solids handling valve and move the piston along the vertical axis of the solids handling valve 16 so as to close the throat by the abutment of the tapered shoulder 58 with the seat 60 and the radial displacement of the fluid-actuated rings 66 by the expansion of the bellows 68. The coal hopper is then pressurized by opening valve 79 so as to pressurize the contents of the coal hopper to the desired pressure necessary to discharge the pulverized coal into the coal gasifier 12. This discharge of the pulverized coal from coal hopper 10 into gasifier 12 is gravity aided and is achieved by opening valve 18 accomplished by opening valves 80 and 84 and closing valves 82 and 86. This moves the piston 46 and valve 18 in the same manner as described above for the vertical displacement of piston 46 and valve 16. After coal is discharged at the selected rate from coal hopper 10 which may be easily achieved by the selective operation of the valves 80 and 82 the valve 18 is closed. This closing of the valve is achieved as described above for valve 16 by opening valves 86 and 82 and closing valves 80 and 84. The coal hopper 10 is then returned to ambient pressure by venting the coal hopper 10 through valve 79. The coal loading and discharging procedures are then repeated as described above.

It will be seen that the present invention provides a fluid-actuated valve which is particularly suitable for utilization in highly corrosive environments, such as found in coal gasification operations. It is expected that the solids handling valve of the subject invention will decrease the down-time of coal gasifiers significantly due to the the greater operating life of the subject valves as compared to valves previously employed in coal hopper applications.

What is claimed is:

1. A fluid-actuated valve comprising a valve housing having a longitudinally extending throughgoing passageway with a converging segment and a diverging segment therein defining a throat in said passageway with said diverging segment being disposed downstream of said throat with respect to material flow in said passageway, an elongated fluid displaceable piston disposed in said passageway and extending through said throat, means at opposite ends of said piston for movably supporting the piston in said passageway, a conically tapered shoulder carried by said piston with said shoulder having a maximum diameter greater than said throat, seat means defined by a circular lip of a diameter greater than that of said throat with said seat means being disposed adjacent to said throat in said diverging segment and contactable by said shoulder for providing a primary valve closure seal, radially expandable means carried by said piston and contactable with a surface of said valve housing at a location near said seat means in said diverging segment for providing a secondary valve seal, and fluid-actuatable means for expanding said expandable means against said valve housing at said location when said shoulder is contacting said seat means.

2. A fluid-actuated valve as claimed in claim 1, wherein the surface of the valve housing contactable by said radially expandable means is a circular recessed surface.

3. A fluid-actuated valve as claimed in claim 1, wherein said means at opposite ends of said piston for movably supporting the piston comprise a pair of annular open-ended bosses supported by said housing in said passageway on opposite sides of said throat and extending with the open ends thereof towards one another, fluid passageways are in said housing in registry with the interior of each of said bosses and coupled via valved conduit means to a source of pressurized fluid, one end portion of said piston is disposed within the boss located nearest said converging segment of the housing, the other end of said piston is of an annular configuration defining a receptacle therein of a diameter greater than the other boss located in the passageway on the diverging segment side of said throat for receiving said other boss therein, and wherein the pressurized fluid from said source displaces said piston or maintains the latter at a desired position within said passageway when the pressurized fluid is admitted to a selected one of said bosses.

4. A fluid-actuated valve as claimed in claim 3, wherein said radially expandable means comprises a helically wound metal coil, wherein said fluid-actuatable means is an annular bellows carried by said piston at a location disposed radially inwardly from said coil in a contacting relationship therewith, and wherein passageway means are in said piston in registry with said bellows and said receptacle for conveying said pressurized fluid into said bellows to expand said coil when the pressurized fluid is admitted into said receptacle.

5. A fluid-actuated valve as claimed in claim 3, wherein the boss located nearest said converging segment of the housing is provided with an inwardly tapered end portion near the open end thereof.

* * * * *